United States Patent [19]
Ottesen et al.

[11] Patent Number: 5,630,104
[45] Date of Patent: May 13, 1997

[54] APPARATUS AND METHOD FOR PROVIDING MULTIMEDIA DATA

[75] Inventors: Hal H. Ottesen; Gordon J. Smith; George W. Van Leeuwen, all of Rochester, Minn.

[73] Assignee: International Business Machines Corporation, Armonk, N.Y.

[21] Appl. No.: 444,116

[22] Filed: May 18, 1995

Related U.S. Application Data

[60] Division of Ser. No. 288,525, Aug. 10, 1994, which is a continuation-in-part of Ser. No. 184,417, Jan. 21, 1994.

[51] Int. Cl.$^6$ .............................. G06F 17/00; G06F 9/455
[52] U.S. Cl. .............................................. 395/500; 395/806
[58] Field of Search ........................... 370/94.2; 364/514, 364/514 A; 395/200, 650, 154, 500; 348/7

[56] References Cited

U.S. PATENT DOCUMENTS

| | | |
|---|---|---|
| 4,107,746 | 8/1978 | Conway . |
| 4,138,741 | 2/1979 | Hedlund et al. . |
| 4,142,209 | 2/1979 | Hedlund et al. . |
| 4,420,828 | 12/1983 | Yoshida et al. . |
| 4,422,110 | 12/1983 | Reynolds . |
| 4,439,849 | 3/1984 | Nabeshima . |
| 4,475,132 | 10/1984 | Rodesch . |
| 4,502,082 | 2/1985 | Ragle et al. . |
| 4,513,406 | 4/1985 | Ishihara . |
| 4,535,366 | 8/1985 | Pullen . |
| 4,543,621 | 9/1985 | Lindberg et al. . |
| 4,587,579 | 5/1986 | Cocke et al. . |
| 4,599,667 | 7/1986 | van Blerk . |
| 4,608,618 | 8/1986 | Sturtevant-Stuart . |
| 4,636,885 | 1/1987 | Yamada et al. . |
| 4,654,724 | 3/1987 | Nagano . |

(List continued on next page.)

FOREIGN PATENT DOCUMENTS

| | | |
|---|---|---|
| 2138301 | 7/1995 | Canada . |
| 0664506 | 7/1995 | European Pat. Off. . |
| 2571883 | 4/1986 | France . |
| 04356844 | 12/1992 | Japan . |
| 9214249 | 8/1992 | WIPO . |

OTHER PUBLICATIONS

Masatsugu Tanji et al., "Video and audio disk file system", Third International Conference On Optical Mass Storage, Los Angeles, CA, USA, Proceedings of SPIE, vol. 529, Jan. 22–24, 1985, pp. 116–125.

(List continued on next page.)

*Primary Examiner*—Kevin J. Teska
*Assistant Examiner*—Russell W. Frejd
*Attorney, Agent, or Firm*—Roy W. Truelson

[57] ABSTRACT

A disk drive stores multimedia data in long spiral data tracks. The tracks on opposite surfaces of the disk spiral in opposite directions, so that a track on one surface can be read as the actuator sweeps in, and a track on the opposite surface can be read as the actuator sweeps out. Because the actuator only follows spiral tracks without performing long seek operations, the actuator motor can be reduced in size and stresses on actuator bearings and other parts are reduced. Additionally, due to reduced disturbances associated with seeks, it is possible to follow tracks more closely and therefore reduce the width of individual tracks. Further cost reductions are accomplished by spinning the disks at a slower speed and reducing the size of the spin motor accordingly. Finally, data density can be increased simply because multimedia data does not require the same low error rate as conventional data. Preferably, a group of disk drives optimized for multimedia data is used to form a video-on-demand system. Compressed, interleaved portions of a video presentation, such as a motion picture, are stored in blocks on the spiral tracks. The drives read the blocks on one spiral track at a time from beginning to end, placing the data from these blocks in a set of buffers corresponding to different short time intervals. Video signals are output from the buffers. Any short time interval of the presentation can be accessed on demand by switching to the appropriate buffer.

7 Claims, 10 Drawing Sheets

U.S. PATENT DOCUMENTS

| | | |
|---|---|---|
| 4,714,967 | 12/1987 | Bizjak . |
| 4,757,488 | 7/1988 | Nagai et al. . |
| 4,796,098 | 1/1989 | Giddings . |
| 4,797,752 | 1/1989 | Giddings . |
| 4,814,903 | 3/1989 | Kulakowski et al. . |
| 4,819,218 | 4/1989 | Barnard . |
| 4,841,441 | 6/1989 | Nixon et al. . |
| 4,893,256 | 1/1990 | Rutherfoord et al. . |
| 4,935,917 | 6/1990 | Yoshimaru . |
| 5,001,570 | 3/1991 | Tagawa . |
| 5,166,921 | 11/1992 | Matsui . |
| 5,195,092 | 3/1993 | Wilson et al. ............... 370/94.2 |
| 5,202,875 | 4/1993 | Rosen et al. . |
| 5,208,665 | 5/1993 | McCalley et al. . |
| 5,253,124 | 10/1993 | Kondo et al. . |
| 5,262,964 | 11/1993 | Bonsall et al. ............... 364/514 |
| 5,268,846 | 12/1993 | Bonsall et al. ............... 364/514 |
| 5,341,474 | 8/1994 | Gelman et al. ............... 395/200 |
| 5,369,533 | 11/1994 | Ottesen et al. . |
| 5,394,548 | 2/1995 | Nakajima et al. ............... 395/650 |
| 5,412,629 | 5/1995 | Shirane . |
| 5,440,677 | 8/1995 | Case et al. ............... 395/154 |
| 5,461,415 | 10/1995 | Wolf et al. ............... 348/7 |
| 5,487,167 | 1/1996 | Dinallo et al. ............... 395/650 |
| 5,508,732 | 4/1996 | Bottomley et al. ............... 348/7 |
| 5,508,940 | 4/1996 | Rossmere et al. ............... 364/514 A |
| 5,510,843 | 4/1996 | Keene et al. ............... 348/446 |
| 5,511,002 | 4/1996 | Milne et al. ............... 364/514 R |

OTHER PUBLICATIONS

IBM Technical Disclosure Bulletin, "Spiral Track Disk Format For Continuous Data Rate", vol. 36, No. 9A, Sep. 1993, pp. 491–492.

IBM Technical Disclosure Bulletin, "Data Storage", vol. 20, No. 7, Dec. 1977, pp. 2581–2583.

Patent Abstracts of Japan, vol. 13, No. 87, p. 835, (JP–A–63268160, Nov. 4, 1988), Feb. 28, 1989.

Patent Abstracts of Japan, vol. 16, No. 341, p. 1391, (JP–A–4102267, Apr. 3, 1992), Jul. 23, 1992.

Patent Abstracts of Japan, vol. 12, No. 29, p. 660, (JP–A–62180540, Aug. 7, 1987), Jan. 28, 1988.

Patent Abstracts of Japan, vol. 13, No. 377, p. 922, (JP–A–1130375, May 23, 1989), Aug. 22, 1989.

"Framework for Interactive Video–On–Demand Service", by A Singru and A. Kumar, IEEE, Computers and Communications, 1995 Int'l. Phoenix Conference, Jul. 1995, pp. 636–642.

Terry Costlow, "Redesigned Disk Drives Go To The Movies", Electronic Engineering Times, Jan. 17, 1994, pp. 37, 39, 40 and 53.

Rick Boyd–Merritt, "Video–On–Demand Battle Brewing", Electronic Engineering Times, Oct. 4, 1993, pp. 1 and 114.

P.J. Mulholland et al., "Servo Track Writer", IBM Technical Disclosure Bulletin, vol. 20, No. 11 Apr. 1978, pp. 4616–4618.

F. Tsui et al., "Helical Data Track Access Control", IBM Technical Disclosure Bulletin, vol. 15, No. 3, Aug. 1972, pp. 1043–1044.

M. Johnson, "DASD–Based Signal Correlators", IBM Technical Disclosure Bulletin, vol. 27, No. 5, Oct. 1984, pp. 3017–3018.

D.H. Brown et al., "Sprial Direct Access Storage Device Format For Non–Stop Multimedia Data Transfers", IBM Technical Disclosure Bulletin, vol. 37, No. 8, Aug. 1994, pp. 7–8.

R.A. Aziz, "Data Storage", IBM Technical Disclosure Bulletin, vol. 20, No. 7, Dec. 1977, pp. 2581–2583.

W. L. McNeil, "Addressing Method To Support Video Memory Interleaving", IBM Technical Disclosure Bulletin, vol. 30, No. 11, Apr. 1988, pp. 79–84.

R. Baber, "Multimedia Extensions To Tutorial Manager For Officevision", IBM Technical Disclosure Bulletin, vol. 33, No. 2, Jul. 1990, p. 440.

R. A. Pascoe, "Interactive Computer/Video Server", IBM Technical Disclosure Bulletin, vol. 34, No. 3, Aug. 1991, pp. 67–68.

R. A. Pascoe, "Automatic Multiple Source Selection In A Video Conference", IBM Technical Disclosure Bulletin, vol. 34, No. 7A, Dec. 1991, pp. 385–386.

R. A. Pascoe, "Multimedia Bitmap Video Imaging In An OS/2 Window", IBM Technical Disclosure Bulletin, vol. 34, No. 7A, Dec. 1991, pp. 402–403.

R. H. J. deNijs, "Multimedia Network System", IBM Technical Disclosure Bulletin, vol. 35, No. 4B Sep. 1992, pp. 118–119.

B. K. Aldred et al., "Electronic Phone Book For Video Conferencing", IBM Technical Disclosure Bulletin, vol. 36, No. 06A, Jun. 1993, pp. 57–62.

APPARATUS AND METHOD FOR PROVIDING MULTIMEDIA DATA

CROSS REFERENCE TO RELATED APPLICATION

This is a divisional of co-pending application Ser. No. 08/288,525 filed on Aug. 10, 1994, which is a continuation-in-part of co-pending application Ser. No. 08/184,417 filed Jan. 21, 1994.

FIELD OF THE INVENTION

The present invention relates to rotating disk data storage apparatus, and in particular to devices used for storing multimedia data.

BACKGROUND OF THE INVENTION

Modern data processing systems such as computers and other equipment require large capacity mass data storage devices. A common storage device is the rotating magnetic disk drive. A typical rotating magnetic disk drive contains one or more disks mounted on a common spindle. Data is recorded on magnetically encoded "tracks" located on the flat surfaces of the disks. Typically, both surfaces of a disk are used for recording data, although in some designs a single surface is used. A movable "actuator" positions a read/write transducer head adjacent one of the tracks to read or write data on the track.

Such magnetic disk storage devices have been extensively used to store computer programs, text files, databases, etc. Typically, conventional computer data of this sort is contained in small chunks, or records. These records are "small" in the sense that they are small in relation to the total volume of storage available on the disk drive. A disk drive will therefore contain a large number of such records, any one of which might be needed by the computer system at a moment's notice. A disk drive must be able to rapidly respond to a request by the computer system for any record stored on the disk.

The type of data stored on disk drives, and the need to access the data rapidly no matter where it is stored, have guided the design of conventional disk drive storage devices. In order to enable the disk drive to rapidly access data anywhere on the surface of the disk, the data tracks are arranged as a series of concentric rings. When a new piece of data is accessed, the actuator must move to the appropriate track (ring), which is known as a "seek" operation. The time required to move the actuator to a new track is the "seek" time. In order to reduce seek time, a powerful electromagnetic motor moves the actuator at great speed from one track to another, across the surface of the disk. But that is not all. Once the actuator has been positioned at the appropriate track, it must wait for the disk to rotate until the desired data is directly adjacent to the transducer head. Sometimes the data will be adjacent to the transducer almost immediately, but at other times the drive must wait for the disk to complete nearly a full revolution before the data is available. The time required to wait until the data is directly adjacent the transducer is known as the latency time, and on the average it will be the time required to complete one-half a disk revolution. To reduce latency, disk drives have been designed to spin the disks at ever faster speeds.

Recently computers and related devices have begun to store different types of data, collectively known as "multi-media" data, on their mass storage devices. Multimedia data is a digitally encoded form of images, such as digitally encoded photographs, motion pictures, animated presentations, music, and other visual and audio images.

Multimedia data imposes a different set of storage requirements from those of traditional computer data. On the one hand, multimedia records are massive, and so the demands for storage devices of much larger capacity are increased. On the other hand, multimedia does not require rapid access to any random part of the record, nor does it require the very low error rates of conventional computer data.

While it is possible to store multimedia data on conventional rotating magnetic disk storage devices, the designs of these devices have been optimized for conventional computer data. There is a need for magnetic disk storage devices which are designed for efficient storage of multimedia data.

A particular application for mass storage of multimedia data is in a "video-on-demand" system. "Video-on-demand" is a system that will provide a user with a video selection from a large library at any time of day. Several such systems have been proposed, but functioning video-on-demand systems are not yet commercially available. To date, there has been no consensus as to how such systems should be constructed, in part due to the lack of storage devices designed for efficient storage of multimedia data.

SUMMARY OF THE INVENTION

It is therefore an object of the present invention to provide an enhanced method and apparatus for storing data, and in particular, for storing multimedia data.

Another object of this invention is to provide a rotating disk storage device which is designed to more efficiently store multimedia data.

Another object of this invention is to reduce the cost of storing multimedia data.

Another object of this invention is to increase the capacity of data stored on a rotating disk storage device, particularly when storing multimedia data.

Another object of this invention is to provide an enhanced method and apparatus for providing multimedia data to a user.

Another object of this invention is to provide a method and apparatus for reading multimedia data from a rotating disk storage device to more closely match the rate at which data is used by a multimedia presentation.

Another object of this invention is to provide an enhanced method and apparatus for providing video-on-demand services.

Another object of this invention is to provide a reduced cost method and apparatus for providing video-on-demand services.

A rotating magnetic disk storage device is optimized for storing multimedia data. Data is stored on both surfaces of a disk in long spiral data tracks, which the actuator follows from one edge of the disk surface to another. The spiral patterns on opposite surfaces of the disk spiral in opposite directions, so that a spiral pattern on one surface can be read as the actuator sweeps in, and a spiral pattern on the opposite surface can be read as the actuator sweeps out.

Because the actuator merely follows the spiral track on one disk surface as it travels from the outer edge to the inner edge, and follows the spiral track on the opposite surface to travel back to the outer disk edge, the actuator does not normally skip across tracks to perform a seek operation. Accordingly, it is not necessary to equip the actuator with a powerful motor for rapid seeks as is customary in conventional disk drives. In the preferred embodiment, the actuator motor has only the power required to follow the track, reducing size and cost of the drive. Furthermore, by operating only in relatively slow track following movements which sweep across the surface of the disk, stresses on the actuator bearings and other parts are reduced, and it is possible to follow tracks more closely (and therefore reduce the width of individual tracks, increasing data density).

Further cost reductions are accomplished by reducing the size of the spin motor which spins the disks. Because large data records are accessed and typically followed from one end of a track to another, latency is not a major consideration. Accordingly, the disks spin at a much slower speed than is typical for conventional disk drives.

Finally, multimedia data does not require the same degree of data accuracy (i.e., the same low error rate) as conventional data. It has been observed that error rate increases as data density increases. In the preferred embodiment, data density is deliberately increased beyond the point of acceptable data error rate for conventional computer data. The higher error rate causes no perceptible impairment of the multimedia data, and the greater density means that more data can be stored on the disk drive.

Preferably, imbedded servo sectors are formatted with concentric track servo patterns. The drive reads and writes to spiral data tracks by adding a spiral track offset to the position error signal generated by the servo patterns, the spiral track offset ramping linearly with the angular position of the disk from an index position, until the disk completes a revolution to the next index position.

In an alternative embodiment, maximum linear data density can be achieved on all portions of the disk surface by storing data in a spiral data track at a near constant rate of bits per inch, and varying the spindle motor speed as a function of radial position of the actuator to obtain a constant clock rate for data.

In the preferred embodiment, a group of disk drives optimized for multimedia data as explained above is used to form a video-on-demand system. Interleaved portions of a video presentation, such as a motion picture, are stored in blocks on the spiral tracks. The drives read the blocks on one spiral track at a time from beginning to end, placing the data from these blocks in a set of buffers corresponding to different short time intervals. Video signals are output from the buffers. Any short time interval of the movie can be accessed on demand by switching to the appropriate buffer. The blocks of video data are preferably mirrored on the disk storage devices, so that if any one disk drive fails, a back-up copy of the block can be obtained from one of the other drives.

DETAILED DESCRIPTION OF THE PREFERRED EMBODIMENT

Commonly assigned copending U.S. patent application Ser. No. 08/184,417, filed Jan. 20, 1994, by Billings et al., entitled System and Method for User Definition of Data Storage Device Physical Format, is hereby incorporated by reference.

The earlier patent application incorporated above describes some of the different design considerations required for data storage devices intended for multimedia data storage. In particular, it describes how a conventional disk storage device is modified by track formatting alone to more efficiently record different types of data, including multimedia data. The present application describes a multimedia data server system, which includes special purpose disk storage devices designed solely for multimedia data.

Figure 1:
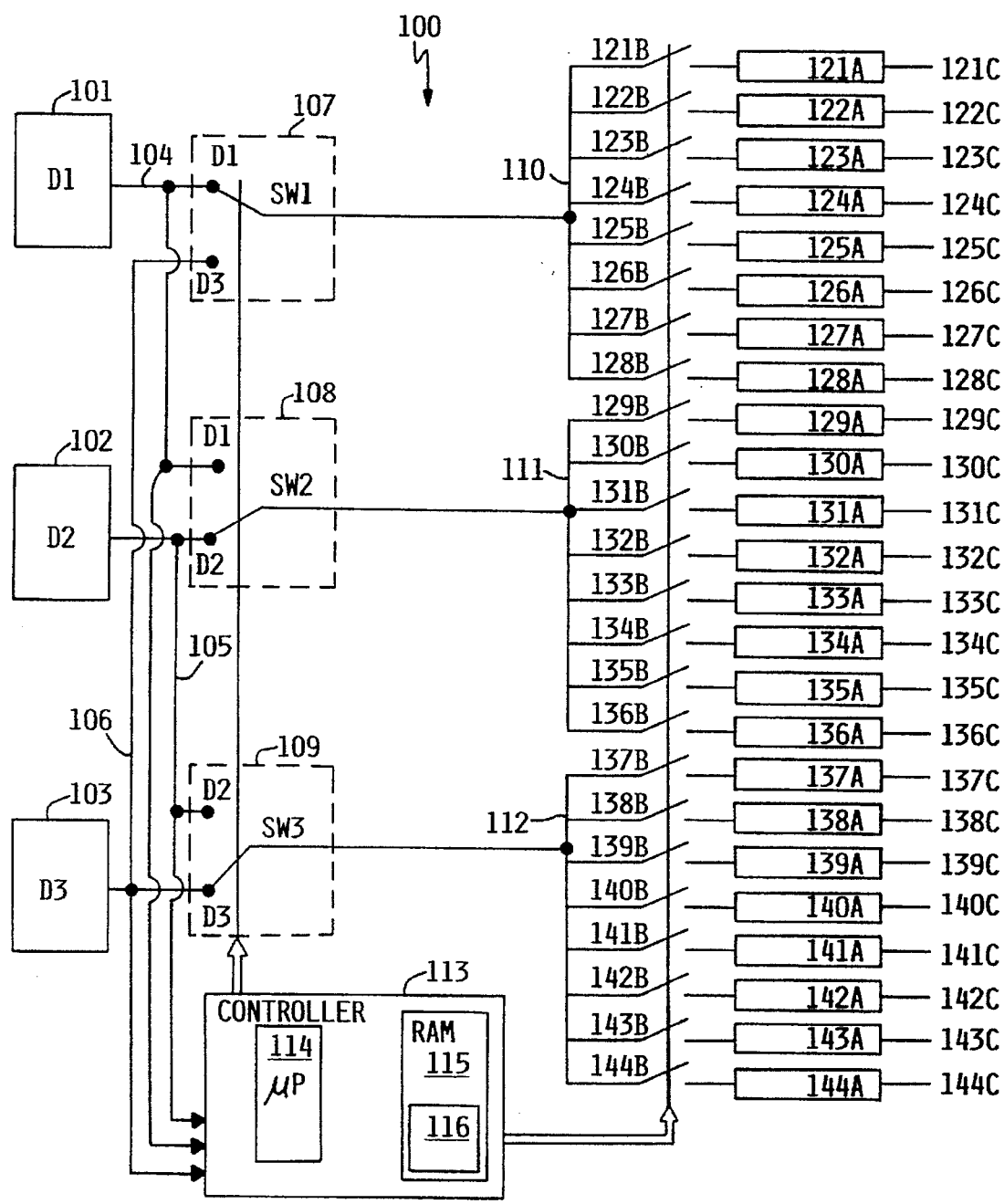
FIG. 1 is a diagram of a mirrored multimedia data server according to the preferred embodiment of this invention.

A diagram of the major components of a multimedia data server 100 according to the preferred embodiment of the present invention is shown in FIG. 1. Server 100 includes three rotating magnetic disk drives 101–103 for storing multimedia data. Data stored on the drives is output on respective data buses 104–106 to switches 107–109. Switches 107–109 connect the drives to a second set of data buses 110–112. Data buses 110–112 provide data signals to a set of 24 data buffers 121A–144A through respective switches 121B–144B. Respective output lines 121C–144C associated with the data buffers provide staggered portions of multimedia data on a continuous basis.

Server 100 provides multiple distinct portions of a multimedia presentation, such as a motion picture, simultaneously on output lines 121C–144C. Thus, for example, for a two-hour motion picture, each output line 121C–144C would output a separate 5-minute interval. A user could connect to the server and choose any 5-minute interval to begin watching. Thus, the presentation effectively starts over again every 5 minutes, so that any user can connect to the system at any arbitrary time and begin watching the presentation from its starting point within 5 minutes of connecting to the server.

The operation of switches 107–109 and 121B–144B is controlled by controller 113 through control lines shown. Control lines are shown as a single line operating multiple switches for simplicity, although it should be understood that controller can operate each switch individually. Controller 113 includes programmable microprocessor 114 and random access memory 115 for storage of a control program 116. Control program 116 executes on microprocessor 114 to control the operation of multimedia server 100. In particular, controller 113 monitors data on busses 104–106 and sequentially gates data being read from disk drives 101–103 to appropriate buffers 121A–144A by causing switches 121B–144B to open and close.

Data is mirrored on drives 101–103, so that in the event of failure of any one drive, the system will continue to provide data from an alternate drive. Controller 113 detects a failure of any of disk units 101–103, and operates switches 107–109 to compensate for failure by loading data into the buffers from an alternate disk drive. The operation of server 100 is explained in greater detail below.

Figure 2:
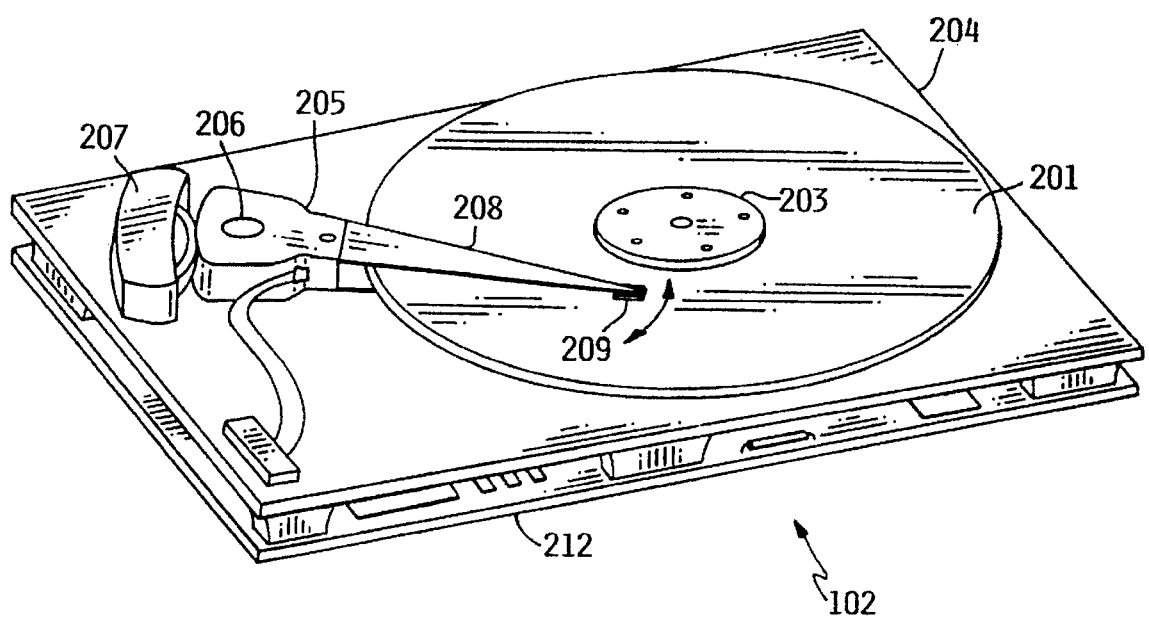
FIG. 2 is shows a typical magnetic disk drive storage unit used in the multimedia data server of the preferred embodiment.

FIG. 2 shows a magnetic disk drive storage unit 102 in accordance with the present invention. In the preferred embodiment, all disk drive storage units 101–103 are identical in construction, having the same data capacity, speed, and other operating characteristics. Disk unit 102 comprises rotatable disk 201, which is rigidly attached to hub or spindle 203, which is mounted on base 204. Spindle 203 includes in-hub spindle motor for rotating disk 201 in the direction indicated. In the preferred embodiment, disk 201 is rotated at a constant rotational velocity. Comb-like actuator assembly 205 is situated to one side of disk 201. Actuator 205 rotates through an arc about shaft 206 parallel to the axis of the spindle, driven by an electro-magnetic motor 207, to position the transducer heads. A cover (not shown) mates with base 204 to enclose and protect the disk and actuator assemblies. Electronic modules for controlling the operation of the drive and communicating with another device, such as a disk drive array controller or a host computer, are contained in circuit card 212, typically mounted outside the enclosure. A plurality of head/suspension assemblies 208 are rigidly attached to the prongs of actuator 205. An aerodynamic read/write transducer head 209 is located at the end of each head/suspension assembly 208 adjacent the disk surface.

Typically, data is recorded on both flat surfaces of disk 201, making two data recording surfaces where one disk is used. However, multiple disks may be stacked on spindle 203 as is well known in the art. It should be understood that the number of disks in a disk drive may vary, and that it is not essential to use both surfaces of each disk. There is one head/suspension assembly 208 for each recording surface.

Figure 3A:
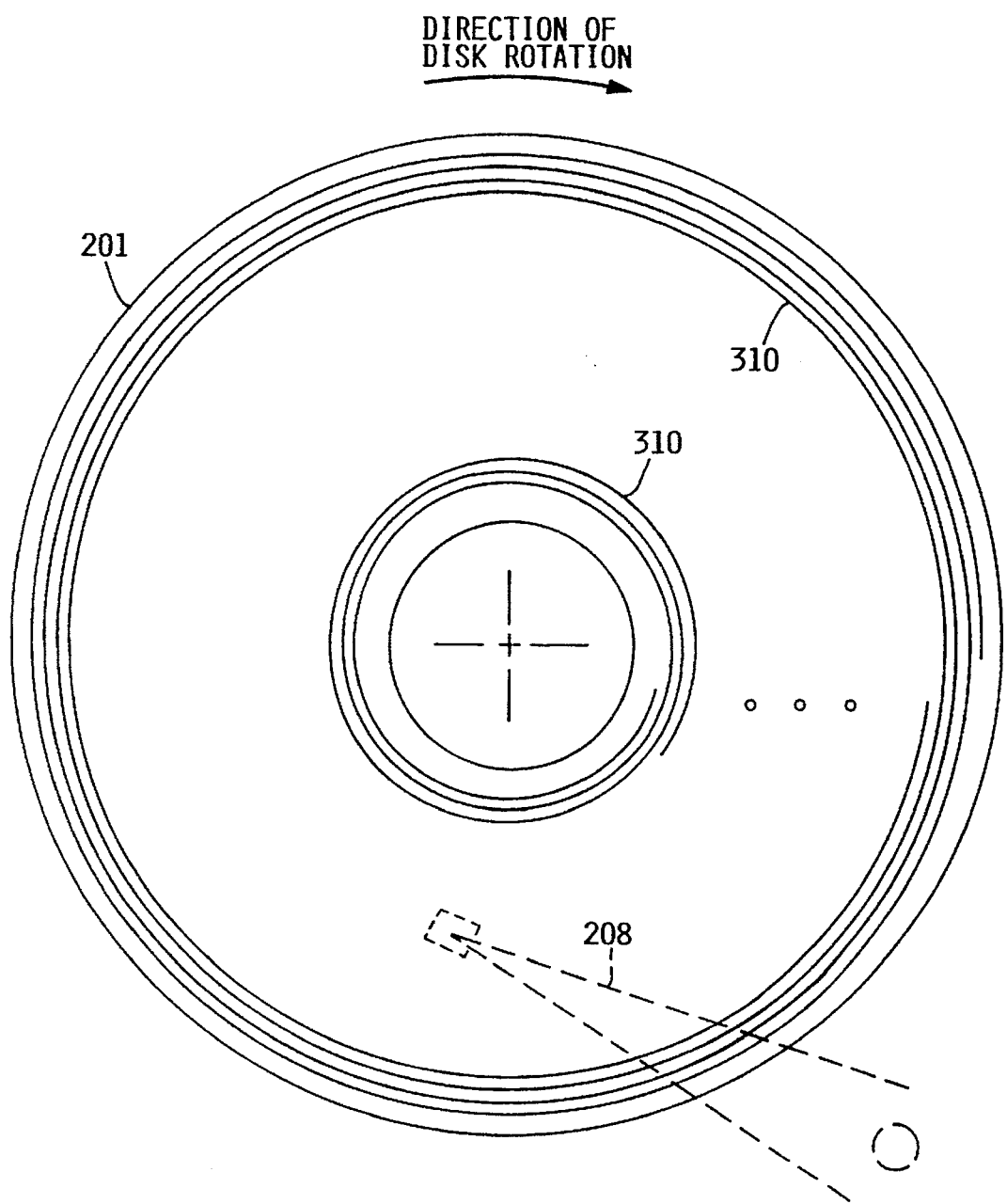
FIGS. 3A and 3B show the orientation of data tracks on the surfaces of disk drive storage units of the preferred embodiment.
Figure 3B:
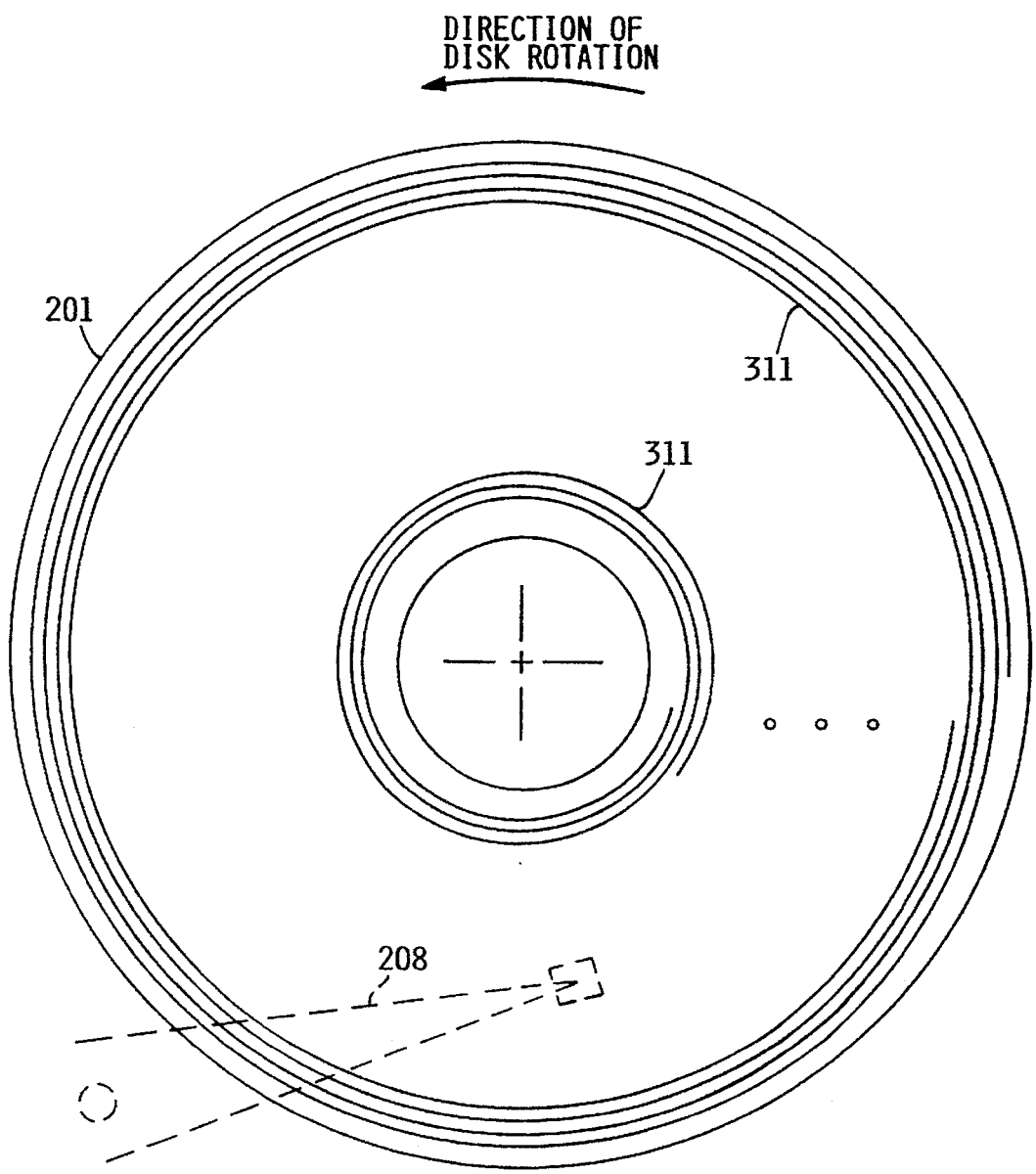

FIGS. 3A and 3B show in greater detail the orientation of data tracks on the recording surfaces of disk 201. FIG. 3A depicts the bottom surface of disk 201 as seen from below, while FIG. 3B depicts the top surface of disk 201 as seen from above. For clarity of orientation, in both FIGS. 3A and 3B, the direction of rotation of the disk is indicated by the arrows, and the suspension arms 208 are shown outlined against the disk surface. Spiral data track 310 on the bottom surface of disk 201 contains a sequence of data blocks beginning at the outer edge of disk 201 and spiralling inward toward the inner edge of disk 201. Spiral data track 311 on the top surface of disk 201 contains a sequence of data blocks beginning at the inner edge of disk 201 and spiralling outward toward the outer edge of disk 201. Data tracks 310,311 additionally contain a plurality of servo sectors interleaved with the data blocks, to enable the drive to identify the track location and follow the center of the track. Techniques for following a data track using embedded servo sectors are known in the art. Only portions of tracks 310,311 are shown in FIGS. 3A and 3B, and these are in exaggerated size for illustrative purposes. In the preferred embodiment, the width of tracks 310, 311 will be less than 3.5 microns, enabling the spiral track to overlap itself thousands of times as it traverses the disk surface.

It should be understood that a pair of recording surfaces having oppositely spiralled data tracks need not necessarily be located on the opposite sides of the same disk. Where multiple disks are mounted in a single drive, it would, for example, be just as easily possible to format both surfaces of one disk with inwardly spiralling data tracks, and both surfaces of another disk with outwardly spiralling data tracks.

In addition to the spiral data tracks described above, disk drive 102 incorporates several design features to optimize the design for multimedia data. First, it is observed that because data is formatted in long spiral data tracks, and the disk drive normally operates by reading long records from beginning to end, sweeping in and out with the actuator, it is not necessary for drive 102 to perform rapid seeks with the actuator. Accordingly, actuator motor 207 is considerably smaller than that typically used for a comparably sized actuator of a conventional disk drive, reducing simultaneously the cost, weight and power consumption of the disk drive. For example, a conventional disk drive actuator for a drive having a 3.5" disk using current technology has an average seek time of approximately 9 milliseconds and power consumption of approximately 2 watts in seek mode at 50% duty cycle. I.e., during seek, a conventional actuator motor must accelerate the actuator, move across the disk surface to a new track, and decelerate the actuator, all within the seek time. In the disk drive of the preferred embodiment, it is only necessary to follow the track, completing a slow sweep across the disk in approximately 150 seconds, and reversing direction at the end of the slow sweep. For example, an actuator motor which is incapable of sweeping the actuator from one edge of the disk surface to another in less than 100 milliseconds would be completely inadequate for the conventional disk drive, but would be perfectly adequate (and in fact more desirable) for the disk drive of the preferred embodiment. It is estimated that the power requirements on the actuator motor of the preferred embodiment would be only about 5% that of the conventional actuator motor.

A second feature designed to optimize drive 102 for multimedia data is the design of the spindle motor which spins the disk. A conventional spindle motor must spin the disk at high speed to minimize the latency time when accessing data. A typical conventional disk spin motor may spin a 3.5" disk at a speed of 5400 RPM, and is a major consumer of power in the disk drive. In accordance with the preferred embodiment, the disks are spun at 2500 RPM to match the rate at which compressed video data is read to the buffers. Because spindle motor power consumed for a given size disk is approximately proportional to the square of the speed, reduction in speed to 2500 RPM will cause spindle motor power consumption to be reduced to approximately 25% that of the conventional drive. It will also permit the spindle motor to be constructed with smaller components, fewer windings and/or less powerful magnets, reducing size and cost.

A third feature of drive 102 is the high data density. Preferably, the tracks are narrower, and the linear density of data within the track is greater, than is possible in conventional disk drives. There are two reasons for this. In a conventional disk drive, the seek time becomes a limiting factor on track width. When an actuator seeks to a new track, it must decelerate and settle to a position in which it is following the track without undue resonance. If all other factors are constant, the narrower the track is, the longer it will take the actuator to settle at the end of a seek, increasing seek time. In the disk drive of the preferred embodiment, no seeks are performed, and hence the time required for the actuator to settle is no longer a limitation on track width. Tracks can accordingly be made narrower.

A second reason increased data density is possible is that multimedia data does not require the same low data error rate as conventionally stored digital data. These considerations are explained in commonly assigned copending U.S. patent application Ser. No. 07/998,278, filed Dec. 30, 1992, by Ottesen et al., entitled Multimedia Data Storage Device, which is hereby incorporated by reference. Conventional data can include computer programs, accounting data, and the like. The alteration of so much as a single bit can drastically affect the output of a program or the meaning of data. Accordingly, in the case of conventional data it is generally accepted that soft error rates should be no more than 1 bit in $10^9$. However, the loss of an occasional bit in multimedia data is not critical. Multimedia data is intended to be "decoded" by human eyes and ears. The human brain automatically performs a form of integrating function, ignoring individual pixels that appear erroneous. As a result, small imperfections in a video or audio signal will generally go unnoticed by the user. In the case of multimedia, an error rate of 1 bit in $10^5$ may be acceptable. It has been observed that, for a given magnetic recording technology recording bits on the surface of a magnetic disk near the limits of the technology, an increase of 6% in recording density causes a tenfold increase in the number of soft errors. Therefore, if it is possible to increase data density by a factor of approximately 24%, without any other modifications, by simply tolerating the higher error rate.

In a conventional disk drive, conventional data can be stored using currently available magneto-resistive head technology at a track density of approximately 4200 tracks per inch, and a linear data density of approximately 135 KBPI (kilo-bits per inch). In the disk drive of the preferred embodiment, track density is increased to approximately 7300 track crossings per inch. Linear data density is 135 KBPI at the inner edge of the recording surface, and decreases somewhat as the track moves outward because data is recorded at a constant clock rate (bytes per second) or constant number of bytes per degree of disk rotation. Preferably, track density is increased (track width is decreased) by reducing the width of the inductive write head. A conventional inductive write head is approximately twice as wide as its corresponding read head. In the preferred embodiment, the write head is reduced to a size only slightly wider than the read head, preferably less than 1.5 times the width of the read head, and most optimally approximately 1.15 times the width of the read head. The read head (magnetoresistive) remains the same size in this example to maintain the same signal-to-noise ratio. While a separate magneto-resistive read transducer and inductive write transducer are used in the preferred embodiment, the present invention could alternatively employ any conventional head technology, such as a thin film combined read/write transducer or a metal-in-gap combined read/write transducer.

Although the linear bit density remains the same in the preferred embodiment, more data can be stored per linear unit of track due to increased formatting efficiency. Because spiral tracks are used and it is not necessary to perform long seeks, certain information in the data sector headers and servo sectors is no longer needed. In particular, it is possible to eliminate the gray code track identifier in each servo sector which is normally used to identify tracks when performing seek operations. It is also possible to eliminate track identifying information in the data headers. It may still be desirable to include track identifying information at intervals (e.g., at an index mark once per disk revolution), but this requires much less disk space than including a gray code track identifier at each of the imbedded servo sectors. The combined effects of increased density and improved formatting efficiency can more than double the total amount of data that can be stored on a disk surface. For the 3.5 inch disk drive of the preferred embodiment, it is possible to store approximately 500 MBytes of data on each surface, or 1 GByte (billion bytes) on the disk drive. Areal density is approximately 500 MBits per square inch.

It will be understood by those skilled in the art that the track densities and linear densities quoted may be varied to achieve similar results. In the preferred embodiment, it is not necessary to increase the linear bit density (increasing the error rate) in order to achieve the specified areal density of 500 MBits per square inch. However, for lower track density, the linear bit density could be increased to achieve this areal density. In particular, where an inductive read/write head is used (thin film head or metal-in-gap head) instead of a separate magneto-resistive read head as in the preferred embodiment, it may be desirable to use lower track density and higher linear density, tolerating the higher error rate if necessary. Using the various techniques described above and elsewhere herein, areal densities in excess of 500 MBits per square inch can be achieved.

In the preferred embodiment, disk drive 102 uses imbedded phase encoded servo sectors to enable a servoing mechanism to position the actuator over the center of the track. I.e., servo information is recorded on the same disk surface as the data, in servo sectors interleaved between data sectors. Servo sectors are spaced apart every 4.5 degrees of disk rotation, making 80 servo sectors per revolution of the disk.

Servo sectors are preferably written to the disk in a conventional concentric manner, rather than using a spiral pattern. I.e., when writing servo sectors, a circular track of sectors is written around the disk, and at an index position the servo writer increments its location by one track width to write the next circular track concentric with the first, successively writing servo tracks in this manner until the disk surface is completely traversed. Spiral data track reading or writing is accomplished by adding a spiral track position error offset to the position error signal generated when reading the servo sectors, the magnitude of the spiral track position error offset being dependent on the angular position of the servo sector with respect to an index position. For example, at the index position, the position error offset will be zero. As the disk rotates beyond the index position, an increasing offset amount is added to or subtracted from the position offset, depending on whether the track spirals inward or outward. At a position 180 degrees from the index position, the offset will be exactly ½ the track width. The servo mechanism is described more fully in commonly assigned copending U.S. patent application Ser. No. 08/184,417, filed Jan. 20, 1994, by Billings et al., herein incorporated by reference.

Figure 4:
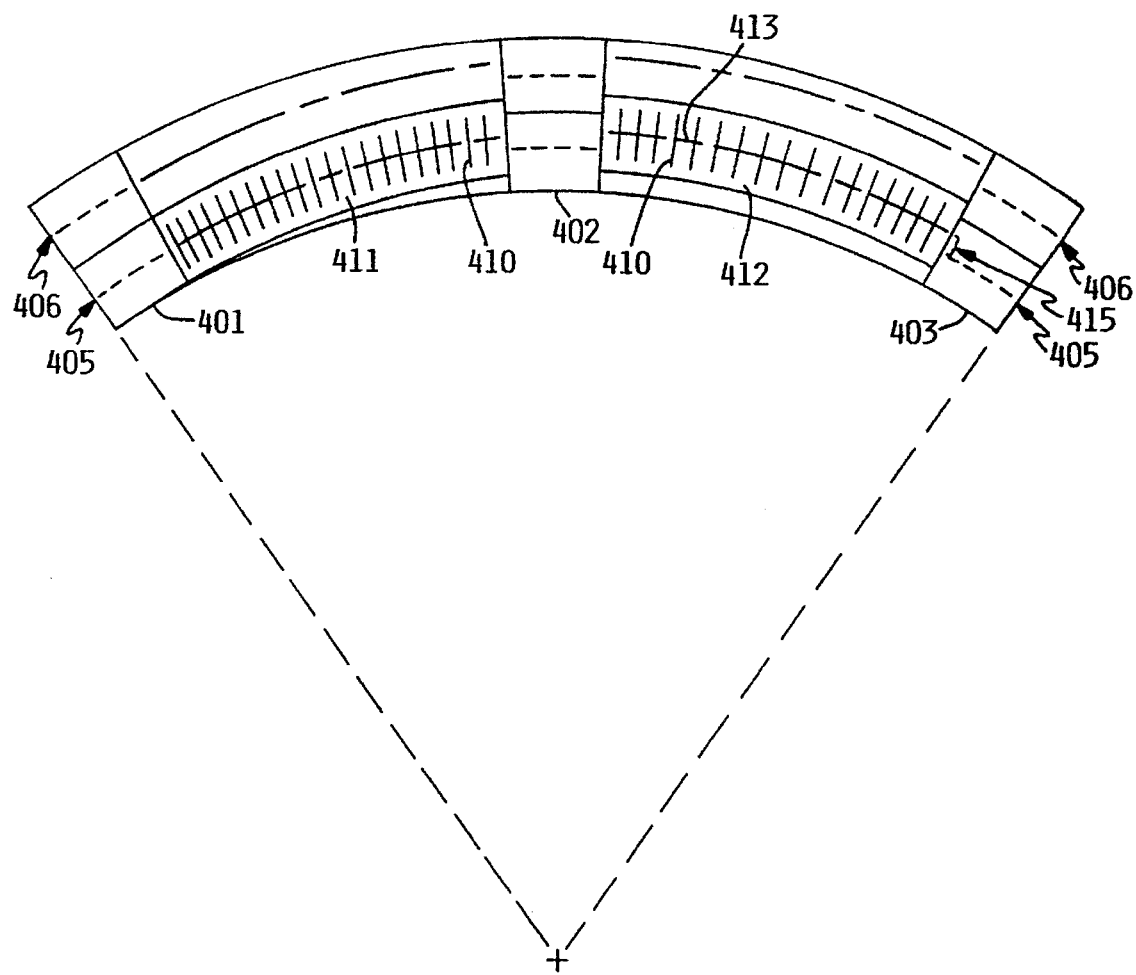
FIG. 4 illustrates the configuration of servo and data sectors in accordance with the preferred embodiment.

FIG. 4 illustrates the configuration of servo and data sectors in accordance with the preferred embodiment. An accurate portion of the disk surface is shown in the figure. Servo sectors 401–403 located at angularly spaced intervals define circular track centerlines 405,406, using any of various servo encoding techniques known in the art. While a phase encoded servo pattern is used in the preferred embodiment, it would also be possible to use amplitude encoded servo patterns. Servo sector 401 is located at the index position. Data track 410 contains data sectors 411, 412 located between the servo sectors. The centerline 413 of data track 410 initially coincides with centerline 406, at the index servo sector 401. As the data track gets farther from the index position, data track centerline 413 deviates farther from centerline 405 defined by the servo sectors. At servo sector 403, one can observe a significant offset 415 between data track centerline 413 and centerline 405 defined by servo sector 403. When the actuator is following a data track, the servo system adds the amount of spiral track offset 415 to the position error detected by the servo sector to obtain the actual deviation from the centerline 413 of spiral data track 410. The amount of spiral track offset 415 will vary depending on the angular position of disk 201. A spiral track position error offset may either be incremented a discrete amount at intervals (e.g., each servo sector), or may be incremented as a continuous mathematical function. It should be understood that the sectors, tracks and offsets are shown in FIG. 4 in greatly exaggerated proportions for illustrative purposes. It should also be understood that servo sectors do not strictly follow radial lines from the disk center, but where a rotary actuator is used as in the preferred embodiment, such sectors are located along the arc defined by the path of the rotary actuator.

Concentric servo sectors are preferred because they simplify the task of initially writing servo sectors to the disk surface. By writing concentric servo patterns, it is possible to write to all surfaces in a single pass, regardless of the direction of the spiral. However, it would be alternatively be possible to write servo sectors in spiral patterns.

Figure 5:
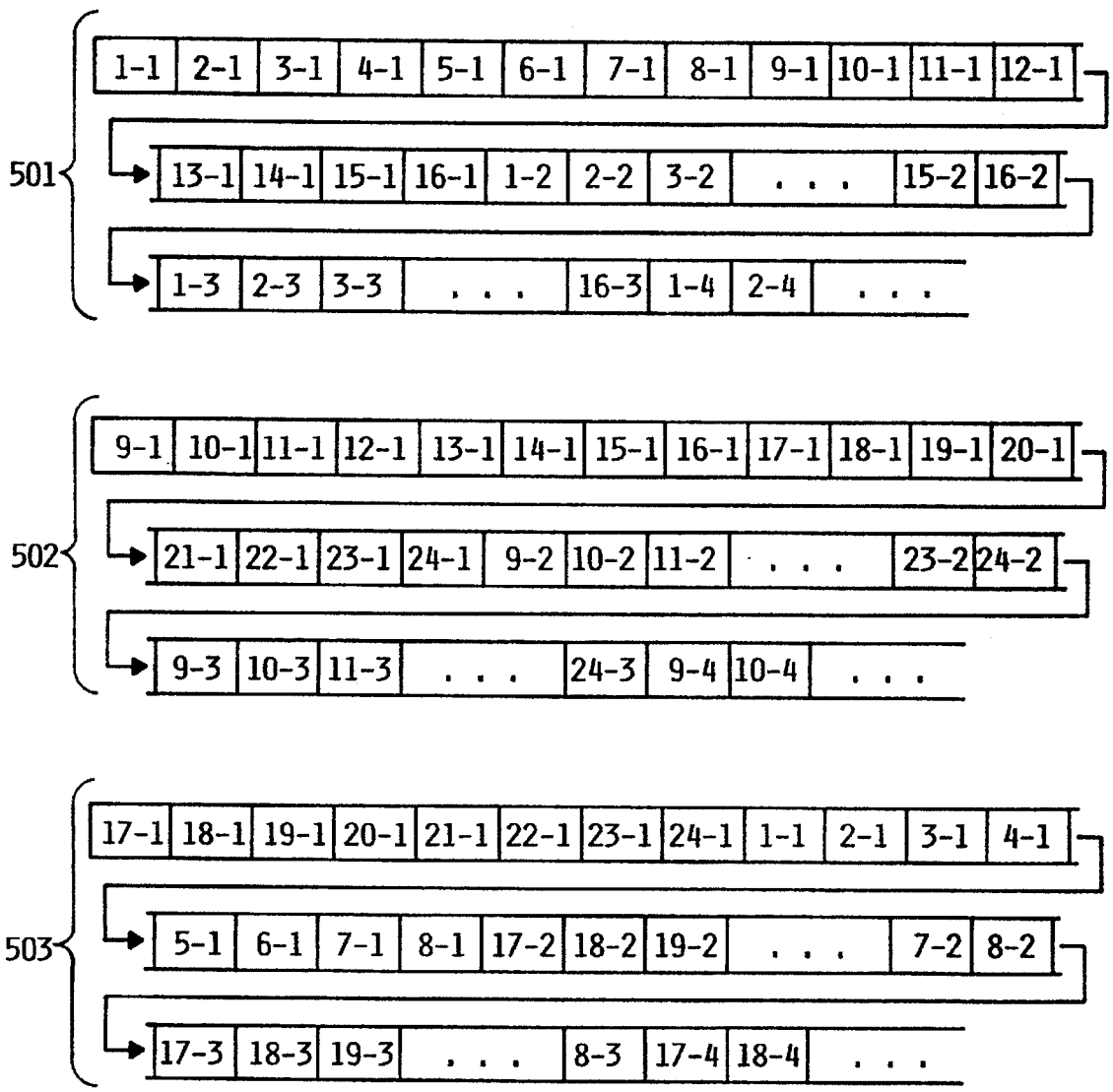
FIG. 5 illustrates how data segments are formatted on the tracks of disk drive storage units in accordance with the preferred embodiment.

Multimedia data is stored on drives 101–103 in a redundant and interleaved fashion. FIG. 5 illustrates how data segments are formatted on the tracks of drives 101–103. A simplified track on drive 101 is shown as reference number 501. Track 502 represents a track on drive 102, while track 503 represents a track on drive 103. Tracks 501–503 contains a plurality of equally-sized data sectors, designated "1-1", "2-1", etc. In the preferred embodiment, each sector holds approximately 900 bytes of data, or approximately ⅙ of a video frame. The sectors are designated with the nomenclature "N-M", where N represents the number of the five minute interval for which the sector contains data, and M is the sequence number of the sector within the five-minute interval. Thus, for example, sector "3-1" is the first sector within the third 5-minute interval. The number of the five minute interval also corresponds to a respective one of the 24 buffers 121A–144A. Sector 3-1, containing data for the third five-minute interval, is loaded into the third buffer 123A. In the preferred embodiment, interleaving is performed on a sector-by-sector basis, each sector being a convenient size. However, the size of an interleaved data segment need not correspond exactly to one sector, e.g., pairs of sectors associated with the same time interval (same buffer) could together constitute a single data segment which is interleaved with other pairs in the same manner that individual sectors are interleaved as shown in FIG. 5.

Physically, track 501 is recorded as two spiral data tracks located on the surfaces of disk 201 of disk drive 101. The first half of track 501 is recorded on one surface of disk 201 spiralling inward, and the second half of track 501 on the opposite surface of disk 201 spiralling outward. Tracks 502 and 503 are recorded in a similar manner on disk drives 102 and 103 respectively.

It will be observed that all data is recorded redundantly on drives 101–103. For example, sector 1-1 is contained on both track 501 and on track 503. It is therefore possible to read data from an alternate drive in the event of failure of any one drive.

It should be understood that the representation of tracks 501–503 in FIG. 5 is illustrative only, and not intended to be a complete representation of the contents of a track. Particularly, a track will preferably contain imbedded servo bursts to enable the data head to follow the track when reading and writing data, as explained above. These servo bursts have been omitted from FIG. 5 for clarity.

Additionally, a data sector typically includes a header portion for identification purposes.

The operation of multimedia server system 100 in conjunction with the disk drives will now be descried. In typical operation, system 100 provides 24 output ports, each representing one 5-minute segment of a 2-hour multimedia presentation, such as a motion picture. Each disk drive unit 101–103 stores ⅔ of the presentation, the entire presentation being stored twice.

Figure 6:
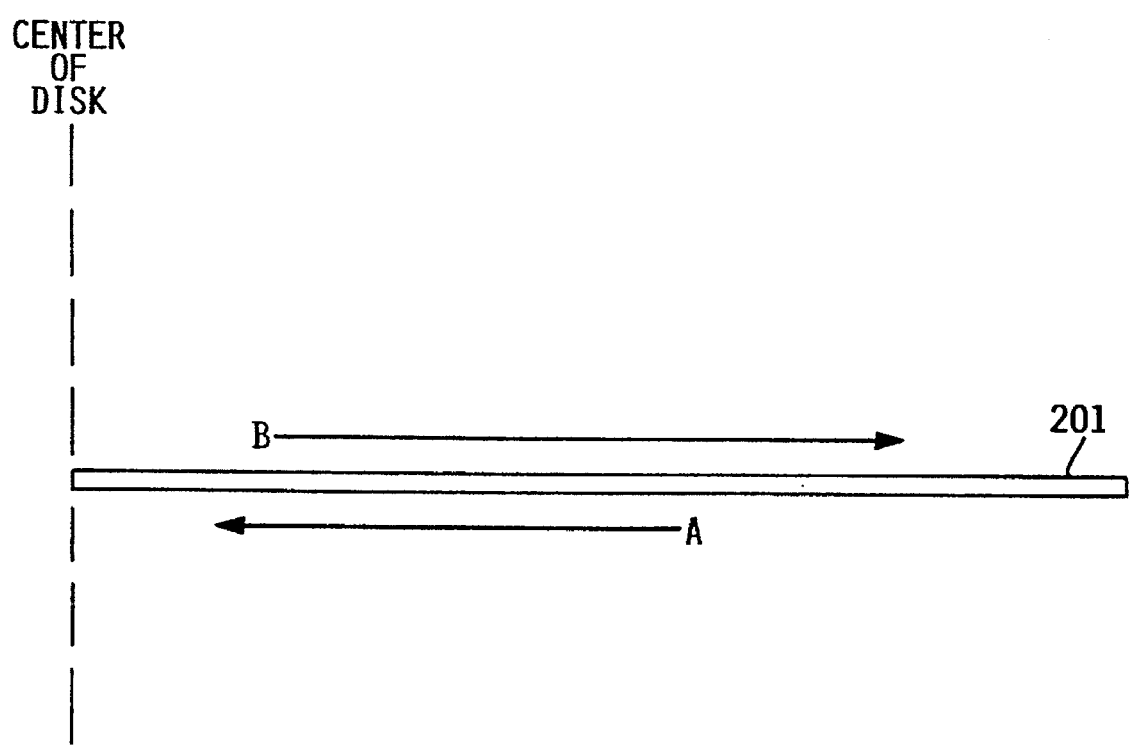
FIG. 6 depicts the steps of the sweep process used for accessing data on spiral tracks in accordance with the preferred embodiment.

Each disk drive operates by following a spiral data track on a single disk surface from beginning to end, having the effect of sweeping the actuator slowly in a continuous motion across the data surface. Because the data being presented at each of the output ports must repeat every five minutes, the drive must complete a sweep across all disk surfaces in the five minute interval. With two data surfaces, each sweep across a data surface requires approximately 150 seconds. It will be appreciated by those skilled in the art that this is a much longer time period than normally required for moving a conventional disk drive actuator during a "seek" operation. Upon reaching the end of a spiral track on one of the data surfaces, the drive electronically switches the read channel electronics to read data from another surface. It then follows the spiral data track on the other surface, sweeping in the opposite direction. Thus it is not necessary to move the actuator back to its original position at the end of a sweep across a disk surface, as it will simply begin its next sweep at the ending location of the first sweep, going in the opposite direction. This process is depicted in FIG. 6. Disk 201 is shown on edge attached to spindle 203. The arrows A and B represent the direction of actuator sweep. The first sweep, represented by A, reads data on the lower surface of disk 201, starting at the outer edge and spiralling inward. The second sweep, represented by B, reads data on the upper surface of disk 201, starting at the inner edge and spiralling outward. Upon completing the two sweeps, the drive repeats the process to read the same data over again, starting again with sweep A. It will be understood that where a disk drive is constructed having multiple disks on a common spindle, it would be possible to complete 4, 6, 8 or more sweeps in accordance with the present invention before repeating the initial sweep.

Switches 107–109 will normally be set as shown in FIG. 1, i.e., with bus 104 from disk unit 101 connected to bus 110, bus 105 from disk unit 102 connected to bus 111, and bus 106 from disk unit 103 connected to bus 112.

Figure 7:
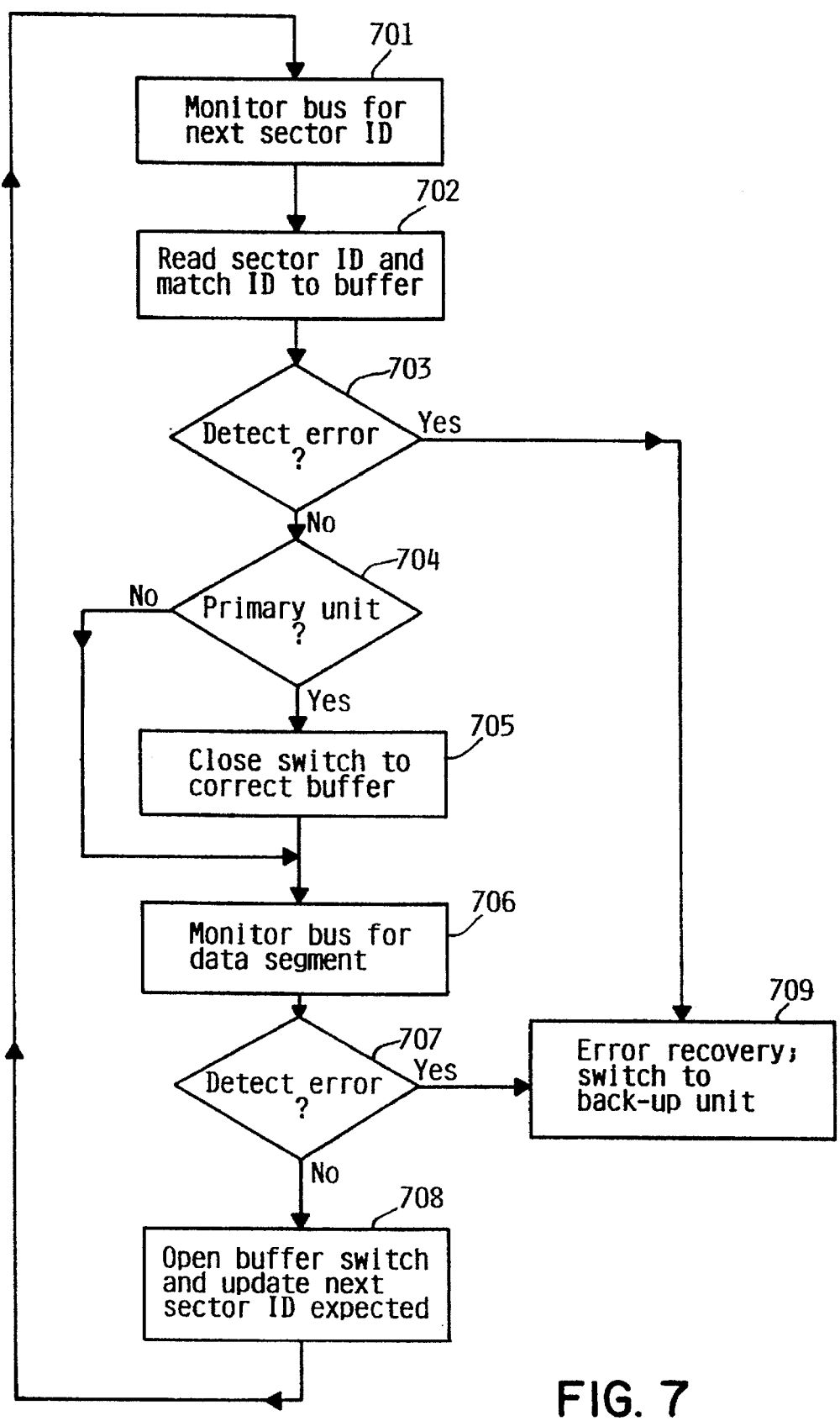
FIG. 7 illustrates the steps taken by the controller to control the operation of the server according to the preferred embodiment.

As data is read by disk drives 101–103, it is output on respective buses 104–106. Controller 113 monitors the data on these buses to operate switches 121B–144B. FIG. 7 illustrates the steps taken by control program 116 executing in controller microprocessor 114 to control the operation of the server.

The controller follows a repetitive process. It monitors the appropriate bus for an expected sector identifier at step 701. The sector ID is output on the bus by the disk drive when it encounters the beginning of a data sector. Because sectors occur in a regular sequence, the controller maintains a record of the expected next sector. At step 702, the controller reads the sector ID from the bus and matches it to the expected sector ID. If the sector ID is garbled or does not match, an error is indicated at step 703, and the control program branches to error recovery (step 709). If the sector ID is correct, the controller determines whether the disk drive from which the sector is being read is the primary device for this sector at step 704. Each disk drive is the primary device for eight buffers and an alternate device for another eight buffers. If the disk drive is the primary device, the controller closes the switch to the appropriate buffer, i.e., the buffer corresponding to the same time interval to which the data sector corresponds, at step 705. If the disk drive is the alternative device, step 705 is skipped. The consequence of skipping step 705 is that the disk unit reads the sector, but the data is never gated into any of the buffers and is not used. The controller then monitors the bus for the actual data following the sector ID at step 706. If no error in the data is detected at step 707, the controller is not required to take any action, as the data is gated directly into the buffers by virtue of the fact that the controller has previously set the buffer switch. When the entire data sector has been transferred, the controller opens the buffer switch and updates its record of the next expected sector at step 708.

In the event that the controller detected an error while monitoring the buffer, it initiates error recovery procedure at step 709. This may involve interrogation of the disk drive, attempts of re-read the data, and other procedures as are known in the an of error recovery. If, however, a disk drive unit has definitely failed and can not be brought back on-line, the controller designates the back-up disk drive unit as the primary unit for the data sectors which would normally be read from the failing unit. These data sectors are then obtained from the backup unit, until the failing unit can be repaired or replaced.

By way of example, as drive 101 reads data sector 1-1 and transmits its contents on bus 104, controller 113 closes switch 121B and opens switches 122B-128B. The data read from sector 1-1 is thus gated only to buffer 121A. When drive 101 finishes reading sector 1-1, controller 113 opens switch 121B and closes switch 122B. Data from sector 2-1 is then gated only to buffer 122A. This process continues through sector 8-1, each sector being read into its appropriate respective buffer 121A-128A by manipulation of switches 121B-128B. Upon reaching sector 9-1, controller 113 opens all switches 121B-128B. Drive 101 reads sectors 9-1 through 16-1, but the data is not gated to any buffer in normal operating mode. This data is used only in the event of a failure of one of the other disk drives. Upon reaching sector 1-2, controller 113 repeats the process by closing switch 121B, allowing data in sector 1-2 to be transmitted to buffer 121A, and so on. Thus, by sequentially manipulating switches 121B-128B, sectors 1-1, 1-2, 1-3, etc. are read into buffer 121A, sectors 2-1, 2-2, 2-3, etc. are read into buffer 122A, sectors 3-1, 3-2, 3-3 etc., are read into buffer 123A, and so on.

Controller 113 concurrently follows the same procedure for remaining switches 129B-144B. I.e., as drive 102 reads sector 9-1, switch 129B is closed and switches 130B-136B are open, gating the data into buffer 129A. As drive 103 reads sector 17-1, switch 137B is closed and switches 138B-144B are open gating data into buffer 137A. Thus, buffers 129A through 136A are successively filled from data stored on disk drive 102, and buffers 137A through 144A are successively filled from data stored on disk drive 103. Sectors corresponding to buffers 137A through 144A (designated "17-x", "18-x", etc., through "24-x") stored on disk trait are 102 are not normally used, but are redundant sectors for use in the event of failure of another drive. Similarly, sectors corresponding to buffers 121A through 128A (designated "1-x", "2-x". etc. through "8-x") stored on disk unit 103 are not normally used.

The disk drives and buses are capable of transferring data to the buffers at burst rates much faster than the rate at which data is displayed in the multimedia presentation. This permits interleaving of data as described above. An individual buffer is filled quickly with data from one of the sectors, and emptied slowly while the other buffers are filled.

The buffers must therefore be sufficiently large to hold an entire sector and to avoid running out of data while other buffers are being filled, but need not be substantially larger than that. In the preferred embodiment, each sector contains 900 bytes of data. A buffer size approximately twice that of a sector, or 1800 bytes, is considered sufficient. Each buffer will be filled every 16th sector, or each 4.8 milliseconds. The preferred spindle motor speed of 2500 RPM, assuming 80 sectors per revolution of the disk, is designed to match this data rate. Preferably, each of buffers 121A through 144A is a standard 2KB semiconductor FIFO buffer, which is only slightly larger than twice the size of a sector.

Interleaving of data segments for different buffers (i.e., different time intervals) is desirable to match the speed of the disk storage device with the rate of data consumption for a typical multimedia application. It would indeed be possible to construct a multimedia storage device without interleaving, but the device would either require very large buffers, or would require speed matching of the disk with rate of data consumption. Without interleaving, assuming a stored data density of 135 KBPI, a conventional video rate for compressed video of 167 Kbytes per second (see explanation below), and a 3.5 inch disk, the disk would have to rotate at a speed of approximately 156 RPM to match the rate at which data is read front the disk surface with the rate at which it is consumed. This is an extremely slow speed for a disk storage device, and may cause the slider to contact the disk surface due to lack of aerodynamic lift for the slider. By interleaving in accordance with the preferred embodiment, data is read from the disk approximately 16 times as fast as it is consumed by multimedia display, allowing the disk motor to spin at a speed of approximately 2500 RPM. This is still considerably slower than required for conventional disk drives, and hence places less stringent requirements on disk bearings and motor. At the same time, it is sufficiently fast to provide aerodynamic lift to the slider.

As explained above, it is desirable to match the speeds of disk rotation, interleaving factors, and number of available buffers. With current technology, this is most practical using some form of data compression of the stored video. In the preferred embodiment, video data is stored on disk drives 101–103 using the Motion Picture Expert Group Standard 1 (MPEG 1) data compression algorithm. For video data, this algorithm yields an average data compression factor of approximately 100 to 1. Using this algorithm, a standard video frame requires, on the average, 5.6 KBytes of storage. With a conventional frame rate of 30 frames per second, a single second of a video presentation will require, on the average, 167 KBytes of storage.

Preferably, data is transferred from disk drives 101–103 into buffers 121A–144A in compressed format, and ultimately presented on ports 121C–144C in compressed format as well. Video data is preferably not decompressed until it reaches the user's presentation system, such as a television screen. The user's presentation system would have to be equipped with appropriate decompression hardware. Chips which decompress data in accordance with the MPEG 1 standard are commercially available.

While the MPEG 1 compression algorithm is used in the preferred embodiment, any suitable compression algorithm could alternatively be used. It would also be possible to compress and decompress data at different stages. For example, data could be stored in compressed format on disk drives 101–103, and decompressed before it is stored in buffers 121A–144A. This may reduce the number of decompression chips required, but at a cost of requiring much larger buffers and requiring greater bandwidth on the transmission medium from the buffers to the user's presentation system. It would also be possible to use no compression algorithm at all, storing and transmitting all data in uncompressed format. However, this would correspondingly increase the hardware requirements of the system, particularly the requirements for storage capacity of the disk drives, and would require matching of linear storage density, disk speed, number of disk drives, level of interleaving, etc.

In the event any one of the disk drives 101–103 fails during operation of server 100, the server can continue to provide the multimedia presentation by switching at appropriate times to backup data stored on the other units. This is accomplished by manipulating switches 107–109. The following example illustrates this failure recovery technique. Suppose that disk drive 102 fails to operate. Controller 113, which monitors the communications of bus 105, will detect that drive 102 is no longer providing required data. Controller therefore changes switch 108 to gate data from bus 104 (stored on disk unit 101) onto bus 111. Disk unit 101 contains a backup copy of the data sectors destined for buffers 129A–136A, which are normally fed by disk drive 102. After switching to gate bus 104 to bus 111, buffers 129A–136A will receive their data from disk drive 101. Data sectors "9-x", "10-x", etc. to "16-x" stored on disk drive 101, which in normal operating mode are ignored, are now transmitted to buffers 129A–136A through buses 104 and 111. Controller 113 alters the timing of switches 129A through 136A so that the switches are opened and closed to correspond with data being presented by disk drive 101 on bus 104, rather that by disk drive 102 on bus 105. Failure of one of the other disk drives is handled similarly.

Figure 8:
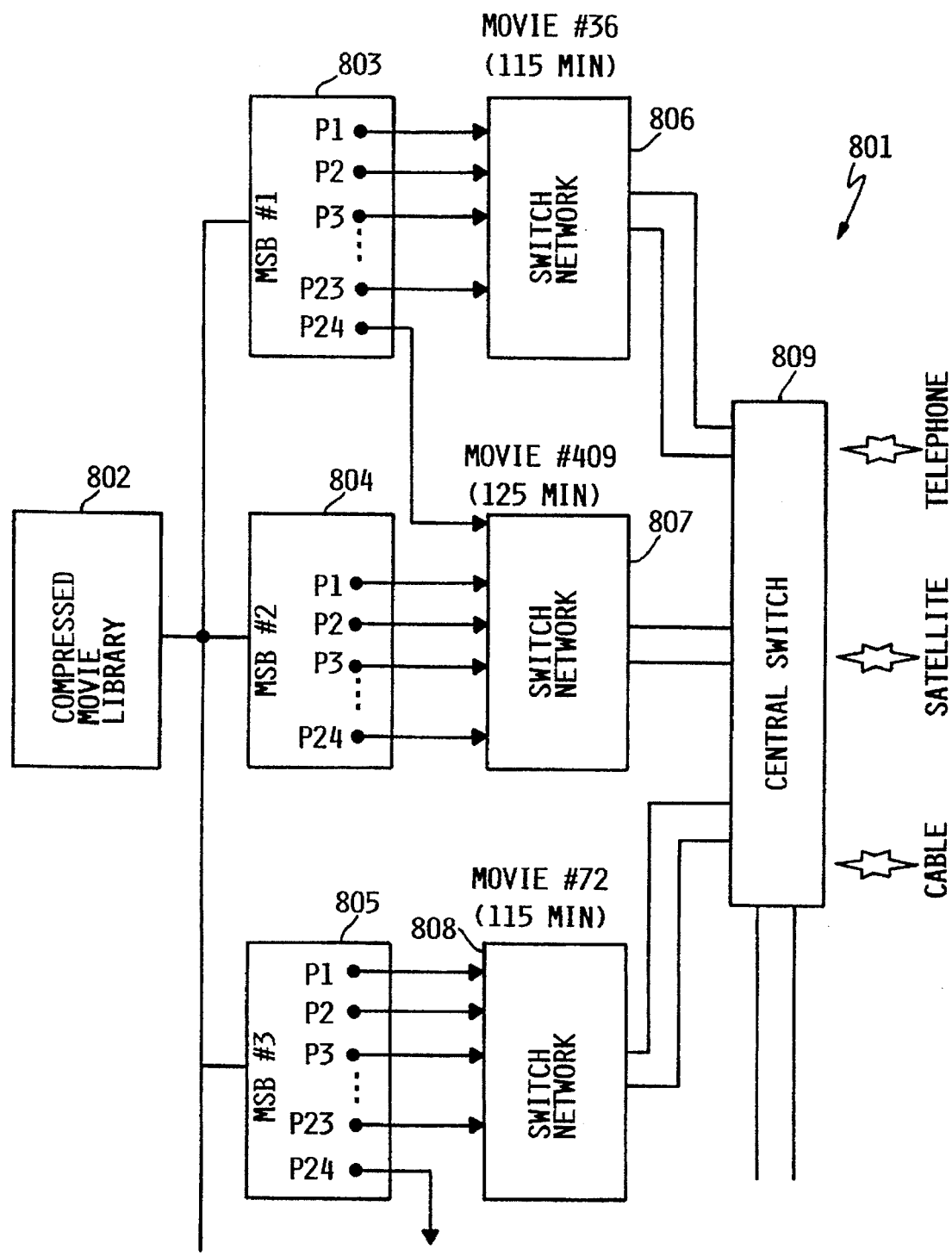
FIG. 8 is a block diagram of a video-on-demand library system using the multimedia data server according to the preferred embodiment.

Multiple servers 100 can be used to create a complete video-on-demand library system. A block diagram of such a system is shown in FIG. 8. Library system 801 includes a compressed movie library 802 coupled to a plurality of multimedia servers 803–805, each of which feeds a respective switching network 806–808 connected to a central switch 809. Each server 803–805 is intended to represent a complete server system 100 as described above, it being understood that the actual number of such devices in a library system may vary.

Compressed movie library 802 contains a large number of movies or other video presentations stored in compressed format. Because the number of entries in the library is large, they must be stored on inexpensive media. For example, magnetic tape or CD-ROM would be appropriate storage choices. When a movie is to be made available, it is downloaded from compressed library 802 to one of servers 803–805. This could either be done in response to a viewer request, or on a scheduled basis. The servers 803–805 then play the selected movies as described above, outputting different time intervals to the appropriate ports. A user of the video service, wishing to view a movie, connects to central switch 809 by telephone, cable or other means, and makes a selection. Central switch then routes the selected video presentation from one of the switch networks to the user. Typically, the user will start viewing at the beginning of the movie from the port showing the first five minute interval. When this five-minute interval has finished presenting, the appropriate switch network will switch the viewer over to the port for the next five-minute interval, and so on. At any time, the viewer may elect to skip ahead, or skip back, one or more intervals. The switch network can also accomplish this upon request of the viewer.

As shown in FIG. 8, a movie that is longer than two hours can require more than one server 803–805. Movie #409, having a length of 125 minutes, is stored primarily on server 804, with a five-minute portion stored on server 803. This five minute portion is interleaved with data from movie #36 to utilize the available unused capacity of server 803. The final port of server 803 will always be showing a segment of movie #409, while the remaining ports of server 803 show different pans of movie #36.

In the preferred embodiment, a specially designed multimedia disk drive is merged into a comprehensive multimedia server system to provide video-on-demand services at reasonable cost and high reliability. However, many variations are possible within the spirit and scope of the present invention. For example, the specially designed multimedia disk drive, having spiral data tracks in either one or opposite directions could be employed in a stand-alone mode as a repository of multimedia data. Additionally, while data redundancy is desirable, it would be possible to reduce cost in a multimedia server environment by recording each data segment only once, foregoing data redundancy.

Many variations are possible in the exact configuration of buses, switches, and devices, depending on data rate and other factors. For example, depending on the data rate of the bus, it may be possible for all disk drives to output data to a common bus, effectively time sharing the available capacity of the bus. This would require that each drive contain a small buffer sufficient to hold data while other drives are transmitting on the bus. The use of such buffers is known in the art. A different number of drives, having different capacities is possible. The configuration of the preferred embodiment was chosen to provide a two-hour multimedia presentation (such as would be typical for a motion picture) with data densities and data rates that are achievable using current technology. It is anticipated that as technology improves and data densities, rates, etc. increase, the optimum configuration may vary. Additionally, where it is desired to store and present multimedia presentations of differing size, it may be desirable to vary the number of devices.

In the preferred embodiment, various mechanical and electro-mechanical features of the disk drives are designed to take advantage of the multimedia environment. In particular, the actuator motor is designed with much lower power than a conventional actuator motor, because it is not required to perform rapid seeks. The disk spindle motor is similarly designed with lower power because it rotates at slower speeds. The actuator bearings and spindle motor bearings are similarly designed for slower speed operation, reducing cost. However, within the scope of the present invention it would be possible to use mechanical designs which are identical to conventional disk drives, and simply format the drives in accordance with the present invention. This would avoid the expense of re-designing existing drives, although in the long run the per-unit cost would be greater than in the preferred embodiment.

In the preferred embodiment, multimedia data is "mirrored" on a plurality of disks, i.e., it is recorded twice. Mirroring provides data redundancy, but also requires a doubling of storage capacity over unprotected storage. In the alternative, data redundancy could be achieved through any of various techniques commonly known as "RAID", or redundant arrays of inexpensive disks. Particularly, one of the plurality of disk drives can be a parity drive which contains only the parity (exclusive-OR) of data stored on other disk drives. In the event of failure of a disk drive, data in the failed drive can be reconstructed on the fly as data is read from the other drives.

In the preferred embodiment, all disk drive storage units have the same storage capacity and performance characteristics. This simplifies the control mechanism and facilitates substitution of one unit for another. However, it would alternatively be possible to practice the present invention using units of varying capacities.

In the preferred embodiment, there is a single spiral track on each disk surface. However, it would alternatively be possible to record multiple interleaved spiral tracks on each disk surface. The use of multiple interleaved spiral tracks effectively reduces the length of each such track, reducing the time required to complete a single sweep of the disk. Depending on the disk drive design, it may be desirable from the standpoint of servo control to sweep the disk faster than the 150 seconds contemplated in the preferred embodiment, and one method of doing this would be to interleave multiple spiral tracks on each disk surface.

In the preferred embodiment, data is read and written at a constant rate across the entire disk surface. This simplifies the electronics, but has the effect of underutilizing disk capacity at the outer edges of the disk surface. As is known in recording art for conventional concentric track disk drives, it is possible to divide the disk surface into a plurality of zones, and vary the recording rate (bytes per second, or bytes per degree of disk rotation) from zone to zone, in order to equalize linear density across the disk surface and obtain maximum capacity from tracks near the outer edge. It would be possible in an alternative embodiment to vary the recording rate of the spiral tracks to increase the data capacity of the disks. This may require corresponding increases in buffer size to accommodate different data rates.

In a further alternative embodiment, it would be possible to maintain a near constant linear density by varying the bytes per degree of disk rotation, and at the same time to maintain a constant clock rate for data (bytes per second) by varying the disk motor speed. Varying of disk motor speed is impractical for a conventional disk drive which must perform rapid seeks from one track to another, since the inertia of the motor would require an unacceptably long latency period before the correct motor speed was reached after a long seek operation. However, where data is recording on a long spiral data track, it would be possible to continuously match the motor speed with the desired data rate as the actuator slowly spirals in and out. For example, in the preferred embodiment a single actuator sweep requires 150 seconds. If the motor of a 3.5" disk drive spins at approximately 2500 RPM when the actuator is at the inner edge of the recording surface, it would have to spin at approximately 1100 RPM when the actuator is at the outer edge in order to maintain a constant data rate at constant linear density. Conventional motors are adequate to gradually increase speed from 1100 RPM to 2500 RPM over a period of 150 seconds, and to reduce speed accordingly.

Figure 9:
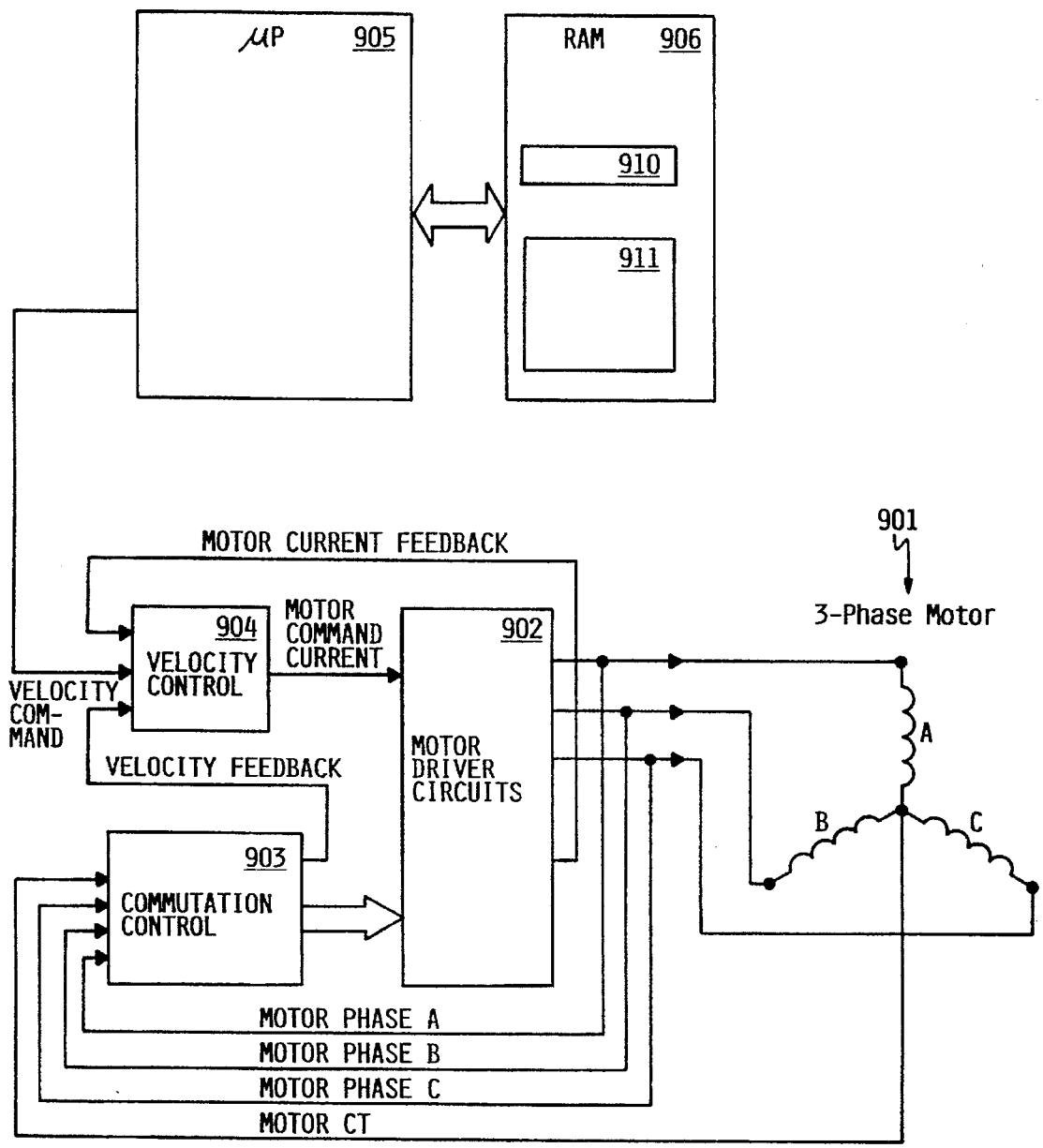
FIG. 9 shows a spindle motor controller circuit for driving the spindle motor at variable speeds, according to an alternative embodiment.

Variation of spindle motor speed to match the data rate as described above can be accomplished using conventional brushless direct current disk drive spindle motors by modifying the motor controller/driver circuitry. FIG. 9 shows a spindle motor controller circuit for driving the spindle motor at variable speeds, according to the alternative embodiment. A conventional 3-phase motor 901 is driven by 3-phase current driver circuits 902. Commutation control circuit 903 receives feedback from the driver phases and a central tap to sequentially switch the phases of current driver circuits 902, as is known in the art. Commutation control 903 provides a velocity feedback signal to velocity control circuit 904. Velocity control circuit 904 also receives a motor current feedback signal from current driver circuits 902. Velocity control circuit compares actual velocity to desired velocity, and adjusts motor drive current accordingly. Microprocessor controller 905, coupled to random access memory 906, sets the desired rotational velocity in velocity control circuit 904. Microprocessor controller is preferably a general purpose microprocessor executing a control program 911 stored in RAM 906, which controls other disk functions as well, particularly the actuator. Microprocessor controller RAM 906 also stores the current radial position of the actuator, e.g., the track location 910. Microprocessor derives desired speed from actuator track position by a linear formula, $V=KT+V_0$, where T is a track number representing the number of track crossings between the present actuator position and the outer edge of the disk, and K and $V_0$ are appropriately chosen constants. The desired speed could alternatively be derived by a look-up table in RAM 906, or different formulae. Periodically, microprocessor controller 905 computes a new desired speed and inputs this to velocity control circuit 904. This may be done every disk revolution or small number of disk revolutions to yield an essentially continuous increase or decrease in motor speed, or may be done less frequently as where the disk surface is divide into a number of annular bands, each having its own associated rate of data bytes per track revolution.

For example, in order to obtain maximum data density at all radial locations, the motor speed is varied substantially continuously by re-computing target speed every disk revolution or small number of revolutions. The clock rate of data reading or writing is held constant, so that the angular rate of data recording (the number of bytes per disk revolution) correspondingly increases continuously as the actuator moves from the inner edge of the disk surface to the outer edge. The constants K and $V_0$ for computing the target motor speed can be appropriately chosen so that the linear data density (bits per inch) remains constant across the entire recording surface. With this alternative embodiment, data densities even greater than in the preferred embodiment would be possible.

In the preferred embodiment, the storage units are rotating magnetic disk drive storage units. Such units are standard in the industry at the present time. However, it would be possible to operate a storage subsystem according to the present invention having storage units employing a different technology. For example, optical disk storage units may be employed.

Although a specific embodiment of the invention has been disclosed along with certain alternatives, it will be recognized by those skilled in the art that additional variations in form and detail may be made within the scope of the following claims.

What is claimed is:

1. A method for providing multimedia presentation data, said multimedia presentation being divisible into a plurality of portions corresponding to successive time intervals, each said portion being for presentation during the respective time interval to which it corresponds, said method comprising the steps of:

reading a plurality of multimedia data segments from at least one mass storage device, each of said multimedia data segments containing multimedia data from a respective one of said portions, wherein a plurality of multimedia data segments contain data from each said portion, and wherein successive data segments read during said step of reading a plurality of multimedia data segments contain data from different ones of said plurality of portions, the data segments containing data from a particular one of said plurality of portions being interleaved among data segments containing data from other portions;

selectively transferring each of said multimedia data segments to a selected one of a plurality of buffers, wherein each of said plurality of buffers corresponds to a respective one of said time intervals, and said step of selectively transferring each of said data segments transfers each data segment containing data from a respective portion to the buffer corresponding to the time interval to which the respective portion corresponds; and simultaneously providing a different portion of said multimedia presentation at a respective output from each of said plurality of buffers.

2. The method of claim 1, wherein said at least one mass storage device is a rotating disk drive storage device, and said step of reading a plurality of multimedia data segments from at least one mass storage device comprises reading a plurality of data segments from at least one spiral data track on a recording surface of said rotating disk drive storage device.

3. The method of claim 2, wherein each said rotating disk drive storage device stores a plurality of data segments containing data from a repetitive sequence of at least some of said plurality of portions.

4. The method of claim 1, wherein said reading step reads said multimedia data segments from a plurality of mass storage devices.

5. The method of claim 4, wherein said multimedia data is redundantly recorded on said plurality of mass storage devices, and wherein said method further comprises the steps of:

detecting an error condition in reading data from a first of said plurality of mass storage devices; and obtaining redundant data from at least one of said plurality of mass storage devices other than said first mass storage device.

6. The method of claim 1, wherein each said data segment is a fraction of a video frame.

7. The method of claim 1, wherein said reading step comprises reading multimedia data segments from each of said at least one mass storage device continually at a substantially constant rate.

* * * * *